(12) United States Patent
Yang

(10) Patent No.: US 7,228,993 B2
(45) Date of Patent: Jun. 12, 2007

(54) FOOD SEASONING QUANTITATIVE DISPENSER

(76) Inventor: Heng-Te Yang, P.O. Box 90, Tainan City 70499 (TW)

( * ) Notice: Subject to any disclaimer, the term of this patent is extended or adjusted under 35 U.S.C. 154(b) by 422 days.

(21) Appl. No.: 10/976,831

(22) Filed: Nov. 1, 2004

(65) Prior Publication Data

US 2006/0086761 A1    Apr. 27, 2006

(51) Int. Cl.
*G01F 11/01*    (2006.01)
*B67D 3/10*    (2006.01)

(52) U.S. Cl. .................... 222/365; 222/510; 222/518

(58) Field of Classification Search ............... 222/184, 222/336, 361, 449, 284, 365, 510, 518
See application file for complete search history.

(56) References Cited

U.S. PATENT DOCUMENTS

| 1,171,575 A | * | 2/1916 | Zsidakovitz | 222/336 |
| 1,547,953 A | * | 7/1925 | Palmer | 222/510 |
| 2,121,878 A | * | 6/1938 | Locker | 222/179.5 |
| 2,312,973 A | * | 3/1943 | Osterbauer | 222/340 |
| 2,630,246 A | * | 3/1953 | Gilmore | 222/142.6 |
| 3,064,858 A | * | 11/1962 | Ziegler | 222/49 |
| 3,446,403 A | * | 5/1969 | Serio et al. | 222/158 |
| 3,512,681 A | * | 5/1970 | Frankel | 222/158 |
| 5,641,096 A | * | 6/1997 | Robbins et al. | 222/284 |

* cited by examiner

*Primary Examiner*—Joseph A. Kaufman
*Assistant Examiner*—Melvin A. Cartagena

(57) ABSTRACT

A food seasoning quantitative dispenser includes a body, a supporter, a center rod, a cap unit and a base. The body has a chamber for storing seasoning, and a conical neck. The supporter has plural feet, an annular wall, a central tubular member and an outlet between the feet, and located under the conical neck. The center rod has two flanges, an annular groove between the flanges and a bottom hole for a spring to fit in. The cap unit has a cap body, a button and a stop disc. When the button is pressed down, the center rod is moved down to let the seasoning fall down through the open bottom of the body and received in the base closed on the bottom of the body. The fallen amount is definite for one time of pressing, so a user can adjust the amount by repeating pressing the button.

5 Claims, 6 Drawing Sheets

FOOD SEASONING QUANTITATIVE DISPENSER

BACKGROUND OF THE INVENTION

1. Field of the Invention

This invention relates to a food seasoning quantitative dispenser, particularly to one consisting of a body, a supporter, a rod, a cap unit and a base. The body has a hollow chamber for storing seasoning, a conical neck for combining with a supporter provided with plural feet and an outlet between the feet, and the support rod supported on the conical neck with a spring fitting in the bottom hole of the rod and the center tubular member of the supporter, and a cap unit closing the upper end of the body and composed of a cap body, a button and a stop disc. When the button is pressed down once, the seasoning in the annular groove of the rod falls down with a definite amount through the open bottom end of the body to be received on the base closing the open bottom of the body. Thus a user can adjust the amount of the seasoning to be taken out by repeating pressing the button.

2. Description of the Prior Art

Food material such as seasonings, coffer, creamer, sugar, or other very small particle or powder drinks are generally stored in a can 10, as shown in FIG. 1, with a cap 11 closing up the can 10. In using, a user takes off the cap 11 and uses a spoon 12 to scoop proper amount of the sugar in the can 10 and then pours in a hot coffee, black tea, etc. However, a user cannot take out just the proper amount for use, often either too much or too little than needed. Chances are that a user has to hold the can 1 with one hand and holds a spoon 12 with the other hand for scooping the material in the can, so the user may let the material on the spoon 12 fall down by accident, giving rise to some embarrassment. If worse, the can 10 may be overturned to let the content fall out on the ground to result in a mess.

SUMMARY OF THE INVENTION

The food seasoning quantitative dispenser in the invention includes a body, a supporter, a center rod, a cap unit, and a base. The body has a hollow chamber for storing seasoning and a conical neck in the lower portion and an engaging member in the upper end. The supporter is located under the conical neck, having an annular wall, plural L-shaped feet extending down from the annular wall, and a center tubular member connected with the lower ends of the feet. The center rod is located vertically in the chamber and supported by the supporter, having two flanges facing the conical neck and an annular groove between the two flanges, and a bottom hole for a spring to fit in and also received in the center tubular member for pushing up the center rod if pushed down. The cap unit consists of a cap body, a button and a stop disc, combined on the open upper end of the body. When the button is pressed down once, the seasoning in the annular groove falls down with a definite amount through the open bottom end of the body to be received in the base. The falling amount is definite for one time of pressing the button. So its amount to be taken out can be controlled by repeating the action of pressing the button.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
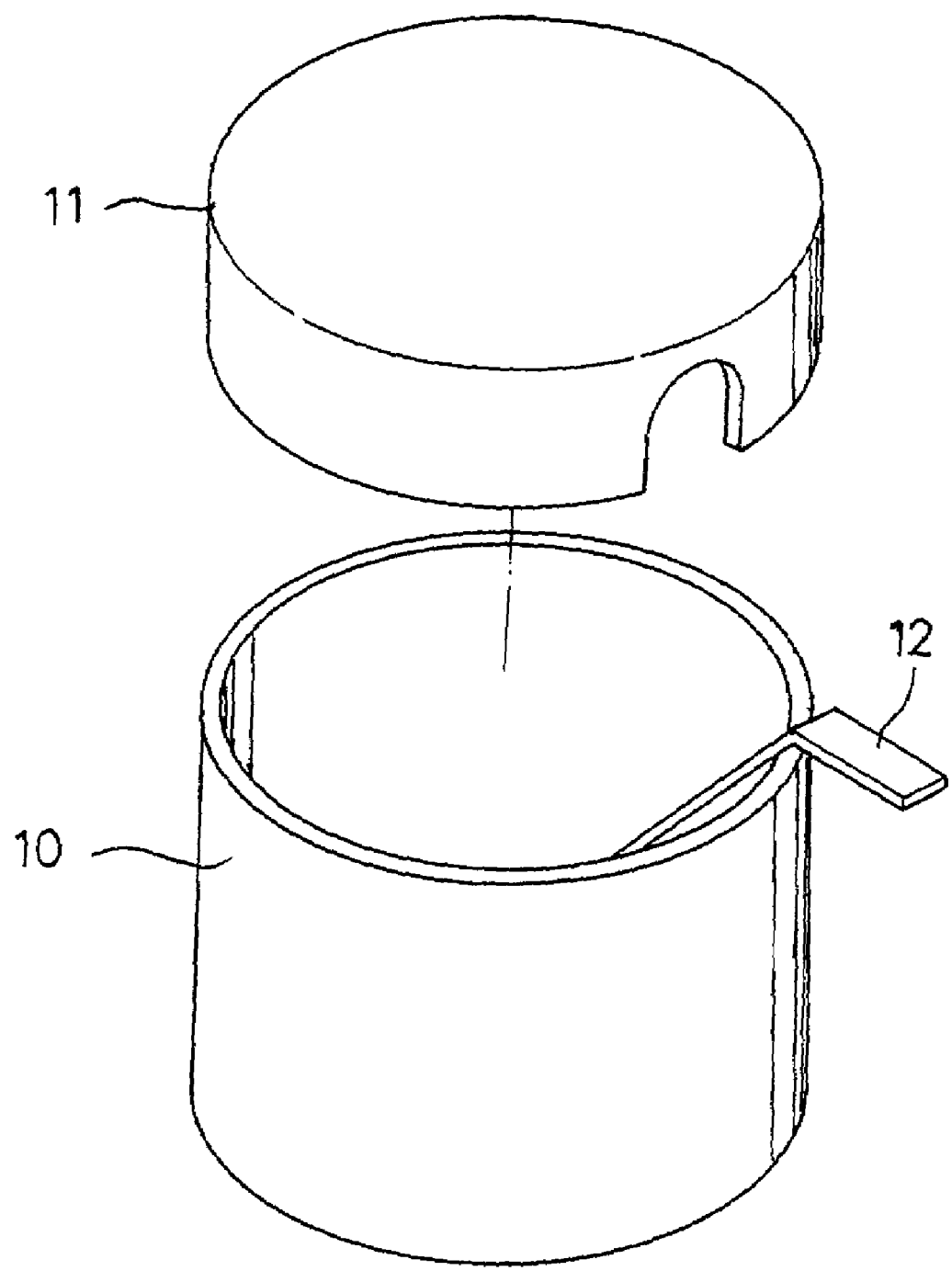
FIG. 1 is a perspective view of a conventional food seasoning can.
Figure 2:
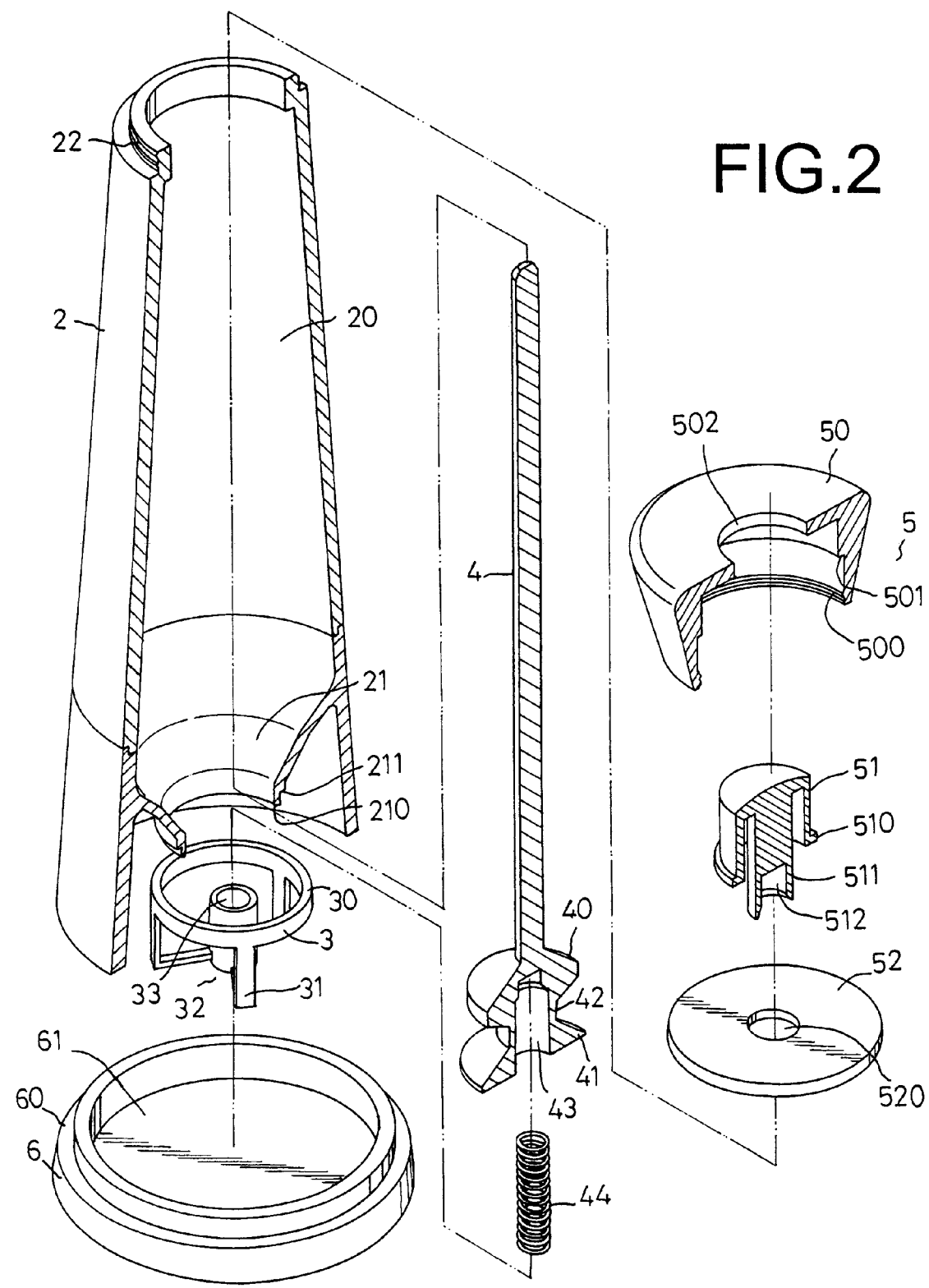
FIG. 2 is an exploded perspective view of a food seasoning quantitative dispenser in the present invention.

A preferred embodiment of a food seasoning quantitative dispenser in the present invention, as shown in FIG. 2, includes a body 2 with a hollow chamber 20, and a conical neck 21 formed under the hollow chamber 20 and sloping down inward, an inner inclined stop surface 210 formed at the lower end of the conical neck 21, an annular insert edge 211 formed on an outer surface of the conical neck 21, and an engaging member 22 at the upper end of the body 2.

The supporter 3 is located under the body 2, having an upper annular wall 30 to contact with the insert edge 211 of the conical neck 21, plural L-shaped feet 31 spaced apart equidistantly and extending down from an upper annular wall 30, an outlet 32 formed between every two feet 31, and a central tubular member 33, which the lower ends of the feet 31 are connected with.

The center rod 4 is located vertical in the chamber 20 of the body 2, having an upper and a lower stop flange 40 and 41 facing the conical neck 21 of the body 2, and an annular groove 42 formed between the two stop flanges 40, 41, and a bottom hole 43 opening downward for a spring 44 to fit in. The spring 44 have its upper end pushing against the upper wall of the bottom hole 43, and its lower end fitted and supported in the hole bottom of the central tubular member 33 of the supporter 3 so that the spring 44 can be compressed when the center rod 4 is pressed down by a button 51 of the cap unit 5, and elastically pushes up the center rod 4 after the button 51 is released.

The cap unit 5 is to close on the body 2, consisting of a cap body 50, the button 51 and a stop disc 52. The cap body 50 has an engaging member 500 in a lower inner surface to engage with the engaging member 22 of the body to combine the cap unit 5 with the body 2, an annular recessed edge 501 on the engaging member 500, and a center hole 502. The button 51 extends up out of the center hole 502 of the cap body 50, having a lower flange 510 with a larger diameter than that of the center hole 502 so as to prevent the button 51 from passing through and falling out of the center hole 502. The button 51 further has a center post 511 extending downward and having a bottom hole 512 for the upper end of the center rod 4 to fit therein so that the button 51 can press down the center rod 4 for the seasoning in the chamber 20 to fall down. The stop disc 52 is located under the button 51, having a center hole 520 for the center post 511 of the button 51 to insert in, and contacting with the annular recessed edge 501 of the cap body 50.

The base 6 is to close up the open bottom of the body 2, having a rim 60 to support the annular bottom edge of the body 2 and a central hollow 61 for the supporter 3 to extend therein as suspended.

Figure 3:
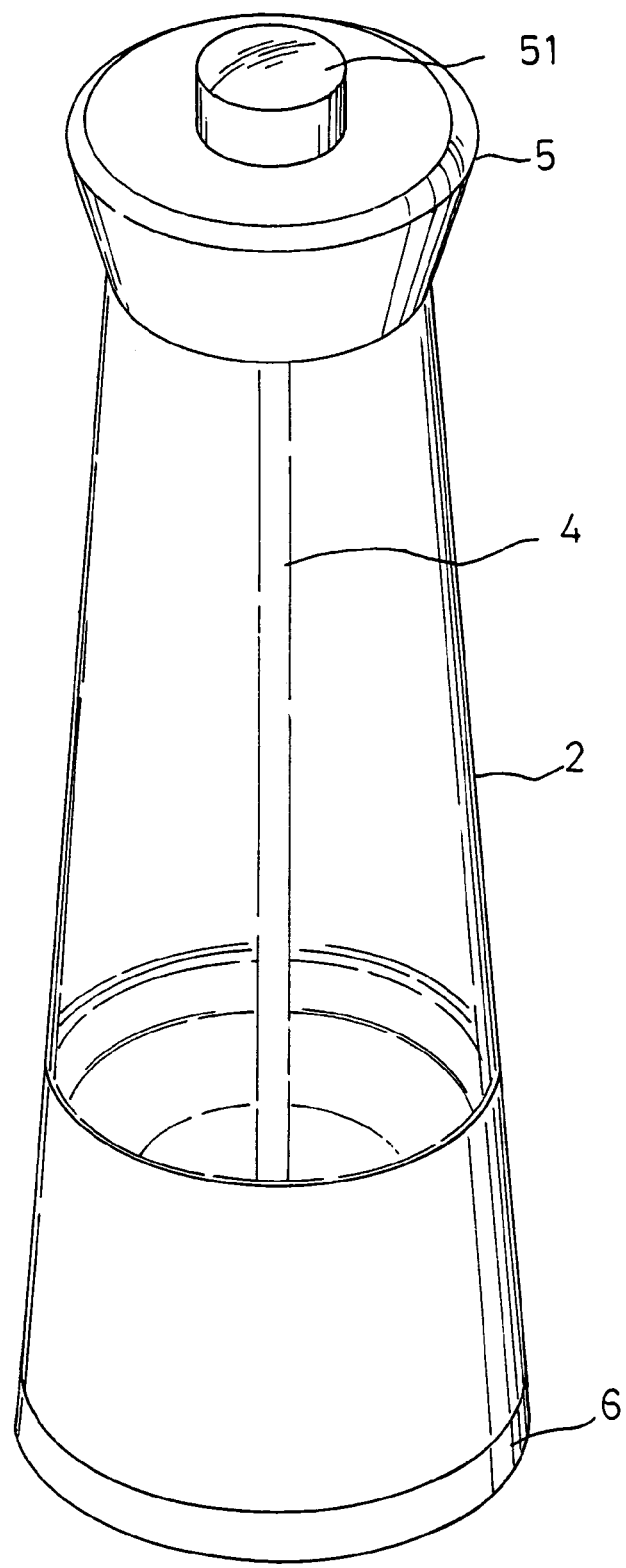
FIG. 3 is a perspective view of the food seasoning quantitative dispenser in the present invention.
Figure 4:
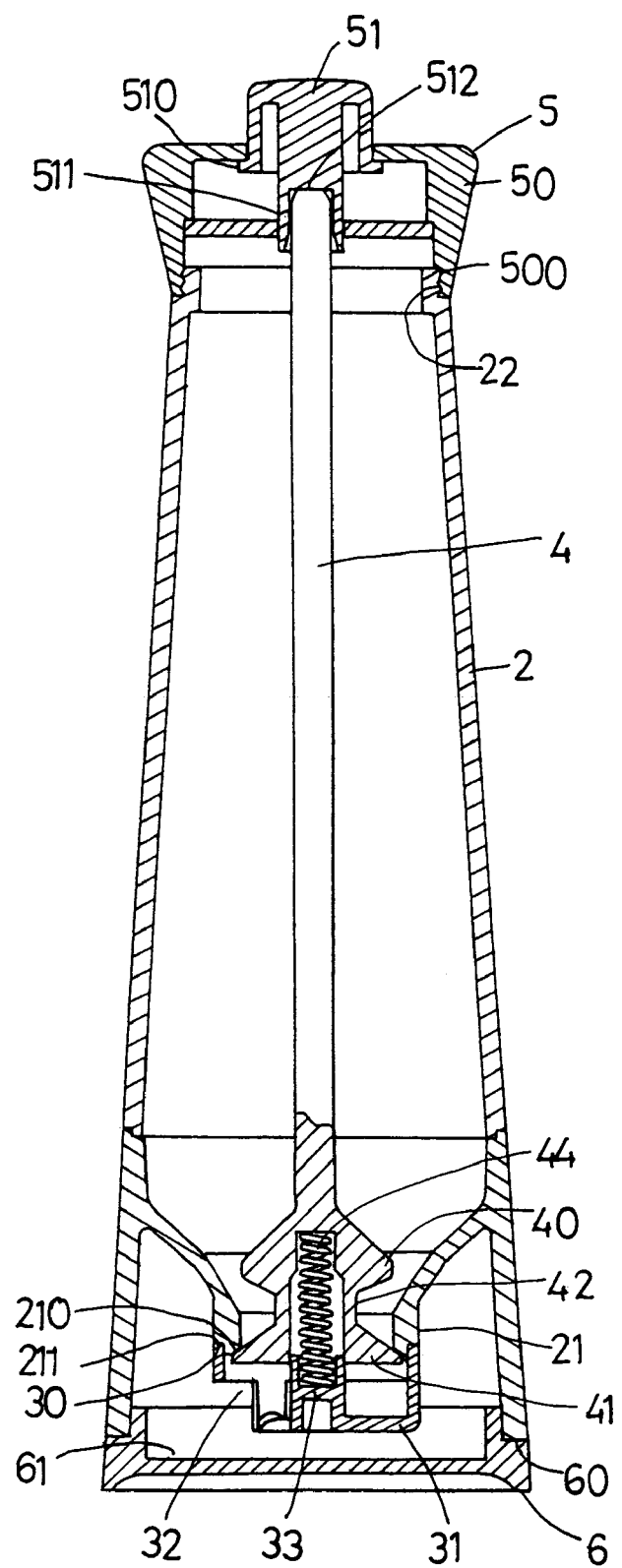
FIG. 4 is a cross-sectional view of the food seasoning quantitative dispenser in the present invention.

In assembling, referring to FIGS. 2, 3 and 4, firstly the upper end of the spring 44 is inserted in the bottom hole 43 of the support rod 4 and the lower end of the spring 44 is inserted and supported by the bottom in the central tubular member 33 of the supporter 3. Then the upper annular wall 30 of the supporter 3 is positioned under the bottom of the conical neck 21 of the body 2 and contacts with the insert edge 211. Subsequently, the button 51 is combined with the cap body 5, with the top of the button 51 passing up through the center hole 502, and with the center post 511 passing down through the center hole 520 of the stop disc 52. The stop disc 52 is positioned to contact with the annular recessed edge 501, and the insert hole 512 of the button 51 is fitted with the top of the center rod 4. Finally the cap body 50 has its engaging member 500 engaged with the engaging member 22, and the base 6 is closed on the open bottom of the body 2, finishing the assembly of the food seasoning quantitative dispenser.

Figure 5:
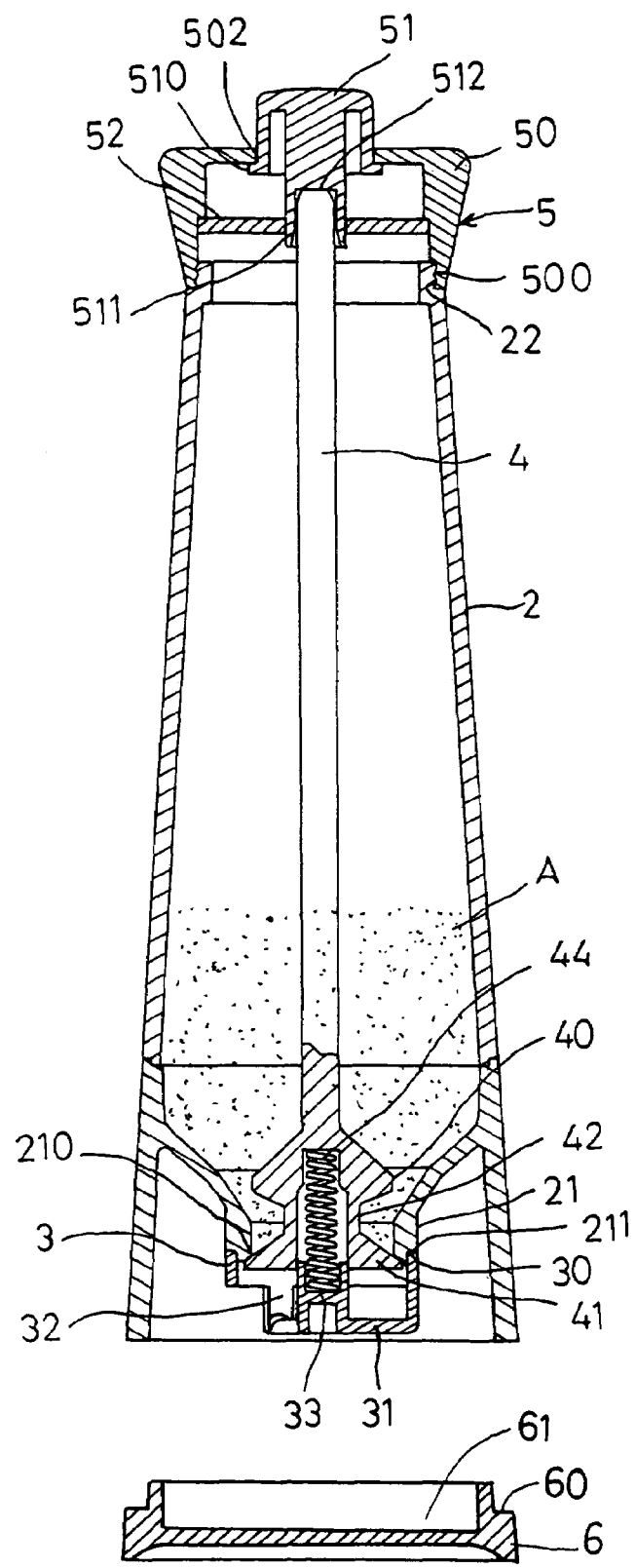
FIG. 5 is a cross-sectional view of the food seasoning quantitative dispenser under a first mode of handling in the present invention; and, FIG. 6 is a cross-sectional view of the food seasoning quantitative dispenser under a second mode of handling in the present invention.
Figure 6:
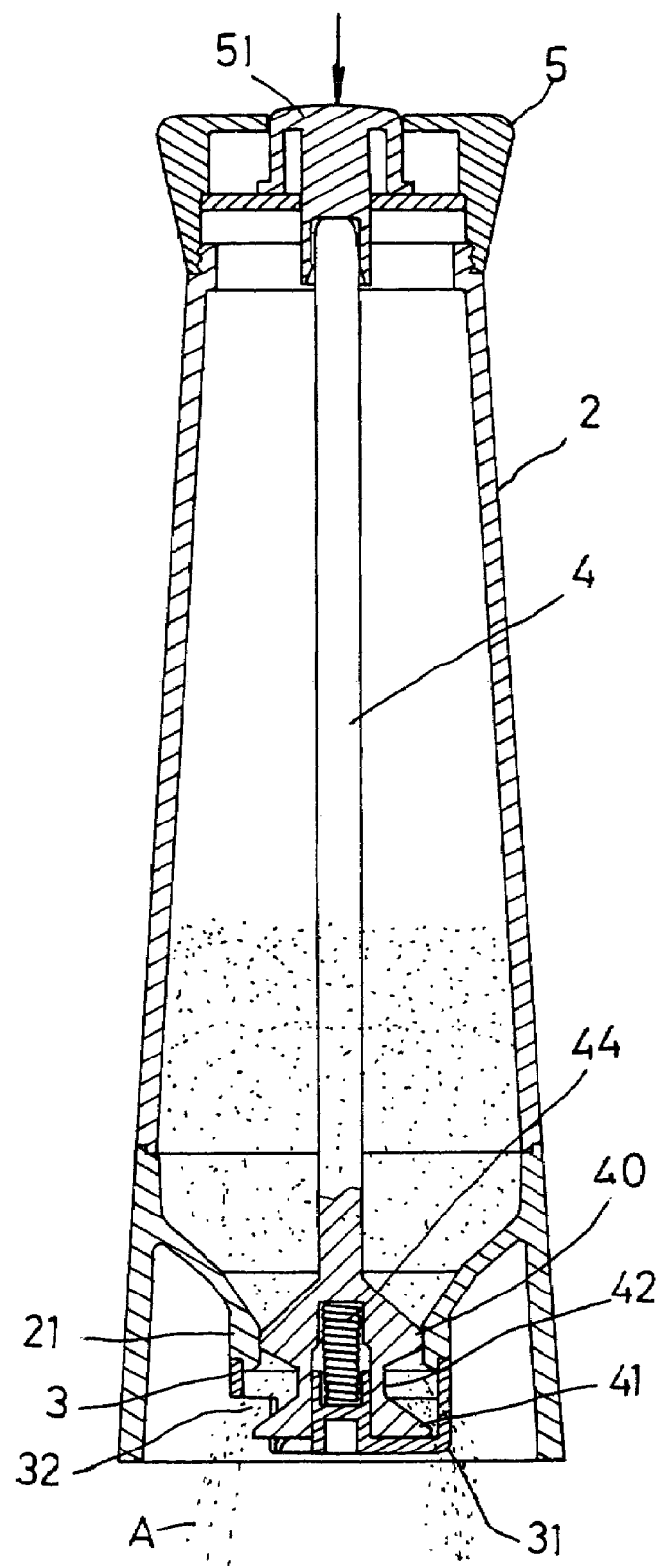

In using, referring to FIGS. 4, 5 and 6, a user fills food seasoning (A), coffee, creamer, sugar, etc., in the chamber 20 of the body 2, and when a user wants it, he/she presses down the button 51 of the cap unit 5 to lower the support rod 4, compressing the spring 44 to compel the upper and the lower flanges 40 and 41 move down so as to let the annular groove 42 communicate with the outlets 32. Then the food seasoning (A) located in the annular groove 42 may fall down through the outlets 32 and down in the base 6. So the fallen seasoning is definite in its amount for one time of pressing the button 51, and a user can push the button 51 for plural times to get the needed amount. If the button 51 is released, the spring 44 recovers its resilience, pushing up the center rod 4 to its original position, with the lower flange 41 moved up to contact with the stop edge 210 of he conical neck 21 so as to stop the seasoning (A) in the body 2 from falling down.

Further, the central hollow 61 of the base 6 can receive very fine or powder seasoning (A) in case of falling during not used condition, convenient for keeping clean and for cleaning. Of course, the base 6 can be used for receiving the fallen seasoning (A) in case of the button 51 is pressed so that the seasoning (A) on the base 6 may be poured in a cup for drinking.

The invention has the following advantages, as can be understood from the foresaid description.

1. The amount to be taken out can be controlled.
2. The button 51 can be repeatedly pressed for adjusting the amount to be taken out.
3. As the conical neck is stopped by the stop flanges of the support rod, preventing the seasoning in the body from leaking out, and preventing the large area of the seasoning in the body from contacting with air so as not to harden.
4. The amount to be taken out by one time of pressing the button is definite, so a user can adjust the needed amount by repeating the action of pressing the button.
5. The base can receive seasoning falling down in case of the button being not in use, keeping clean the table and convenient for cleaning as well.
6. The base also can receive the falling seasoning in its center hollow in case of the button pressed for taking it out for use.

While the preferred embodiment of the invention has been described above, it will be recognized and understood that various modifications may be made therein and the appended claimed are intended to cover all such modifications that may fall within the scope of the invention.

What is claimed is:

1. A food seasoning quantitative dispenser comprising:
   a body having a hollow chamber, a conical neck formed in a lower portion, and an engaging member formed in an upper end;
   a supporter located under said conical neck of said body, having plural L-shaped feet spaced apart equidistantly and extending down, an outlet formed between every two of said L-shaped feet, and a central tubular member which said plural L-shaped feet have their lower ends connected with;
   a center rod located vertically in the center of said chamber of said body, having an upper and a lower flange, an annular groove formed between said upper and said lower flange, a bottom hole formed in the bottom and opening downward, and a spring fitted in said bottom hole with its upper end pushing against the upper end of said bottom hole and with its lower end fitting in and supported by the bottom of said central tubular member; and,
   a cap unit combined in the upper end of said body, having a cap body, a button, and a stop disk, said cap body having an engaging member, a center hole in the upper wall, said button extending up through said center hole of said cap body and having a center post extending down and provided with a hole opening downward to fit with the top end of said center rod; and
   wherein said cap body has an annular recessed edge, and said button has a flange in the lower end, and said flange has a larger diameter than that of said center hole of said cap body so as to prevent said button from passing through said center hole and falling off, and said stop disc of said cap unit is combined with said button by means of said center post of said button fitting in a center hole of said stop disc, and said stop disc contacts with said annular recessed edge of said cap body.

2. The food seasoning quantitative dispenser as claimed in claim 1, wherein said conical neck of said body is provided with an annular sloped stop surface at the bottom end and an annular contact edge on the outer surface at the bottom end.

3. The food seasoning quantitative dispenser as claimed in claim 1, wherein said supporter has an annular top edge to fit with the annular contact edge of said conical neck of said body.

4. The food seasoning quantitative dispenser as claimed in claim 1, wherein said engaging member of said body is male threads, and said engaging member of said cap body is female threads to engage with a male threads base of said body so that said cap body is secured with said body.

5. The food seasoning quantitative dispenser as claimed in claim 1, wherein a base is further provided to close up the open bottom of said body, having a rim to receive the bottom end of said body and a central hollow for receiving falling seasoning from said body.

* * * * *